(12) United States Patent
Sandhya et al.

(10) Patent No.: US 10,389,506 B2
(45) Date of Patent: Aug. 20, 2019

(54) METHOD AND USER EQUIPMENT FOR EFFECTIVE SIGNAL-TO-NOISE RATIO (SNR) COMPUTATION IN RATE ADAPTATION

(71) Applicant: Samsung Electronics Co., Ltd., Suwon-si (KR)

(72) Inventors: Patil Sandhya, Bangalore (IN); Kiran Bynam, Bangalore (IN); Tae Seok Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 42 days.

(21) Appl. No.: 15/472,953

(22) Filed: Mar. 29, 2017

(65) Prior Publication Data

US 2017/0294993 A1 Oct. 12, 2017

(30) Foreign Application Priority Data

Apr. 7, 2016 (IN) .............................. 201641012356
Dec. 5, 2016 (KR) ........................ 10-2016-0164465

(51) Int. Cl.
| | | |
|---|---|---|
| *H04L 1/20* | (2006.01) | |
| *H04W 74/08* | (2009.01) | |
| *H04L 5/00* | (2006.01) | |
| *H04L 12/825* | (2013.01) | |
| *H04W 72/04* | (2009.01) | |

(52) U.S. Cl.
CPC .............. *H04L 5/006* (2013.01); *H04L 47/25* (2013.01); *H04W 74/0825* (2013.01); *H04W 72/0446* (2013.01)

(58) Field of Classification Search
CPC ... H04L 1/0002; H04L 1/0003; H04L 1/0009; H04L 5/006; H04W 72/082; H04W 74/0825

See application file for complete search history.

(56) References Cited

U.S. PATENT DOCUMENTS

| | | | |
|---|---|---|---|
| 7,184,713 B2 | 2/2007 | Kadous et al. | |
| 7,660,600 B2 | 2/2010 | Koo et al. | |
| 7,746,807 B2 | 6/2010 | Kakura et al. | |
| 7,889,758 B2 | 2/2011 | Li et al. | |
| 8,432,866 B1 * | 4/2013 | Tapaninen | ................ H04L 1/20 370/252 |
| 8,958,334 B2 | 2/2015 | Bharghavan | |
| 2004/0120411 A1 * | 6/2004 | Walton | ................ H04B 7/0417 375/260 |
| 2005/0022089 A1 * | 1/2005 | Le | ......................... H04L 1/0001 714/749 |
| 2005/0286440 A1 | 12/2005 | Strutt et al. | |
| 2006/0087974 A1 * | 4/2006 | Ozer | .................. H04L 12/2854 370/235 |

(Continued)

FOREIGN PATENT DOCUMENTS

KR 10-1298175 B1 8/2013

*Primary Examiner* — Scott M Sciacca
(74) *Attorney, Agent, or Firm* — NSIP Law

(57) ABSTRACT

A method to regulate a signal-to-noise ratio (SNR) in a rate adaptation includes: transmitting a frame; determining a status of the transmitted frame; computing a probability of a channel of the transmitted frame being in an idle mode; computing an SNR offset based on the status of the transmitted frame and the probability; and regulating an SNR for transmission, based on the SNR offset.

18 Claims, 9 Drawing Sheets

(56) References Cited

U.S. PATENT DOCUMENTS

| | | |
|---|---|---|
| 2008/0170533 A1 | 7/2008 | Cyzs et al. |
| 2010/0169723 A1* | 7/2010 | Baldo ................ H04L 43/0829 714/704 |
| 2010/0272167 A1 | 10/2010 | Liao et al. |
| 2013/0195053 A1* | 8/2013 | Jeon .................. H04W 72/0406 370/329 |
| 2013/0215948 A1 | 8/2013 | Kim et al. |
| 2015/0215880 A1 | 7/2015 | Rafique et al. |
| 2015/0358982 A1* | 12/2015 | Jeon ...................... H04J 11/005 370/252 |

* cited by examiner

METHOD AND USER EQUIPMENT FOR EFFECTIVE SIGNAL-TO-NOISE RATIO (SNR) COMPUTATION IN RATE ADAPTATION

CROSS-REFERENCE TO RELATED APPLICATIONS

This application claims the benefit under 35 USC § 119(a) of Indian Patent Application No. 201641012356 filed on Apr. 7, 2016 in the Office of the Controller General of Patents, Designs & Trade Marks and Korean Patent Application No. 10-2016-0164465 filed on Dec. 5, 2016 in the Korean Intellectual Property Office, the entire disclosures of which are incorporated herein by reference for all purposes.

BACKGROUND

1. Field

The following description relates to wireless communication, and more particularly, to a mechanism of regulating a signal-to-noise ratio (SNR) in a rate adaptation.

2. Description of Related Art

Ultra-low power (ULP) wireless communication is an emerging field with applications in a body area network, a wireless personal area network (WPAN), and a wireless sensor network. A ULP device in ULP wireless communication includes a ULP transceiver and has a low data rate, for example, under 1 mega bit per second (Mbps), and operates over a short distance, for example, up to 50 meters. The ULP device may achieve power consumption of 1 nJ/bit at a physical layer.

When a media access control (MAC) layer controls a transceiver state efficiently, the low energy consumption per bit at the physical layer may prolong a battery life of the ULP device. The MAC layer turns on the ULP transmitter to transmit a data frame and an acknowledgement. A ULP device receiver may be turned on for a clear channel assessment (CCA) before transmission, an inter-frame spacing, and an acknowledgement (ACK) reception after the transmission.

It is important for the MAC layer to minimize a transceiver turn-on time with respect to the number of bits or frames transmitted by the ULP device. A failed transmission of the frame may be a result of the following events: unfavorable channel conditions for a selected transmission rate downgrading signal strength to a level well below a detectable threshold (referred to as "channel error"), leading to a frame loss; and a frame collision in response to a simultaneous transmission performed by two or more ULP devices (referred to as "channel collision"), resulting in frame loss. In the event of transmission failure, it may be determined whether a cause of the transmission failure is due to a channel error or a channel collision. The failed frame is to be retransmitted, which may lead to an unnecessary increase in a transmitter turn-on time. In addition, when a relatively low transmission rate is selected in a multi-rate physical layer, the transmission duration may be prolonged and, thus, the transceiver turn-on time may also be prolonged.

In related art, a rate adaptation mechanism, for example, an auto rate fallback (ARF), may select a relatively low rate for transmission on the failure. The rate adaption mechanism may be implemented irrespective of channel collision being more pronounced in the WPAN because of inherent issues of a carrier sense multiple access with collision avoidance (CSMA/CA). Some mechanisms adjust a measured signal-to-noise (SNR) of a received frame based on a success and a failure of the transmission. In such mechanisms, when channel collision is more dominant than channel error, an unnecessary downshift may occur in the rate of transmission and the duration of transmission and reception may increase. The failed frames may be retransmitted by the allowed number of times. Due to the retransmissions, an overall throughput of the wireless communication network may decrease. Improved energy efficiency of the ULP device may be achieved when an optimal rate of transmission is selected. Thus, it is important to understand or observe a reason for the failure of transmission.

In the methods and systems of the related art, it is proposed to implement an idle channel listening and a usage of a short control frame before the data frame transmission to learn the reason of the failure of transmission. The aforementioned proposals may not be applicable for the ULP device for the following reasons: a receiver energy being dominant when idle listening is performed; and short frames increasing an overhead and reducing a throughput in addition to extra transmission power.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method to regulate a signal-to-noise ratio (SNR) in a transmission rate adaptation includes: transmitting a frame; determining a status of the transmitted frame; computing a probability of a channel of the transmitted frame being in an idle mode; computing an SNR offset based on the status of the transmitted frame and the probability; and regulating the SNR, based on the SNR offset.

The computing of the SNR offset may include: detecting the status of the transmitted frame as successful; adjusting a step-down value by incorporating the probability; and computing the SNR offset based on a difference between the adjusted step-down value and a candidate offset.

The computing of the SNR offset may include: detecting the status of the transmitted frame as failed; determining a cause of a failure of the transmitted frame based on the probability, wherein the cause is one of a collision error and a channel error; and computing the SNR offset based on the determined cause.

The computing of the SNR offset based on the determined cause may include: detecting the cause of the failure of the transmitted frame as the collision error; and computing the SNR offset based on a candidate SNR offset.

The computing of the SNR offset based on the determined cause may include: detecting the failure of the transmitted frame as the channel error; and computing the SNR offset based on a difference between a step-up value and a candidate SNR offset.

The probability may define a cause rule for each transmitted frame based on a backoff stage that user equipment has entered during a channel access for transmission of the frame.

A non-transitory computer-readable storage medium may store instructions that, when executed by a processor, cause the processor to perform the method.

In another general aspect, a user equipment to regulate a signal-to-noise ratio (SNR) in a transmission rate adaptation includes: a controller configured to transmit a frame, determine a status of the transmitted frame, compute a probability that a channel is in an idle mode, compute an SNR offset based on the status of the transmitted frame and the probability, and regulate the SNR, based on the SNR offset.

The controller may be further configured to detect the status of the transmitted frame as successful, adjust a step-down value by incorporating the probability, and compute the SNR offset based on a difference between the adjusted step-down value and a candidate offset.

The controller may be further configured to detect the status of the transmitted frame as failed, determine a cause of a failure of the transmitted frame based on the probability, wherein the cause is one of a collision error and a channel error, and compute the SNR offset based on the determined cause.

The controller may be further configured to detect the cause of the failure of the transmitted frame as the collision error and compute the SNR offset based on a candidate SNR offset.

The controller may be further configured to detect the failure of the transmitted frame as the channel error and compute the SNR offset based on a difference between a step-up value and a candidate SNR offset.

The probability may define a cause rule for each transmitted frame based on a backoff stage that the user equipment has entered during a channel access for transmission of the frame.

In another general aspect, a method to regulate a signal-to-noise ratio (SNR) in a transmission rate adaptation includes: transmitting a frame; detecting a failure of the transmitted frame; determining a cause of the failure of the transmitted frame to be one of a collision error and a channel error, based on a probability of a channel of the transmitted frame being in an idle mode; and regulating the SNR, based on the determining of the cause of the failure of the transmitted frame.

The regulating of the SNR for transmission may include maintaining an SNR offset, in response to determining the cause of the failure of the transmitted frame to be the collision error.

The regulating of the SNR for transmission may include adjusting an SNR offset, in response to determining the cause of the failure of the transmitted frame to be the channel error.

Other features and aspects will be apparent from the following detailed description, the drawings, and the claims.

Figure 1:
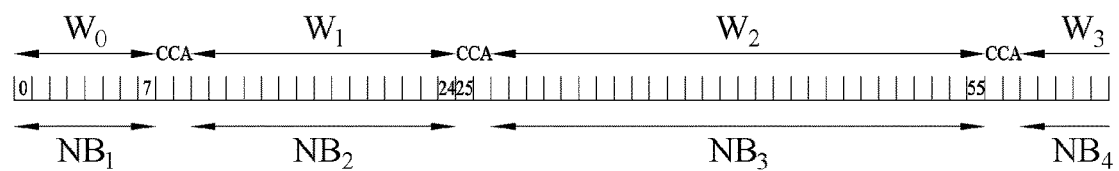
FIG. 1 is a timing diagram illustrating a carrier sense multiple access with collision avoidance (CSMA/CA) associated with a unit backoff time slot and a clear channel, assessment (CCA), according to an embodiment.
Figure 2:
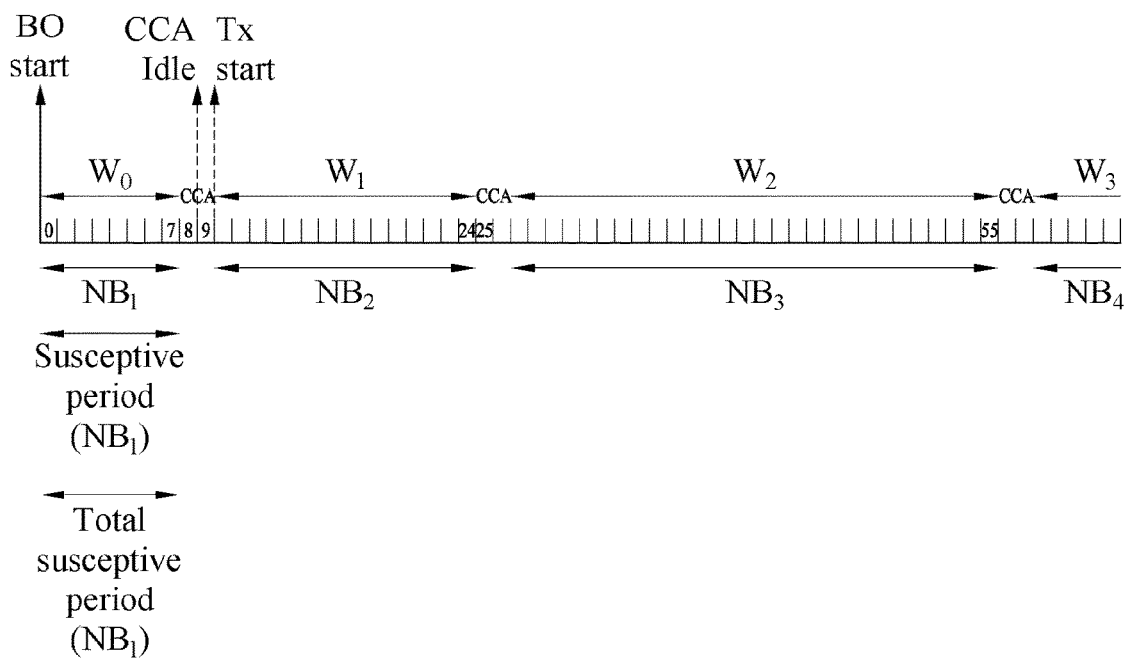
FIGS. 2 and 3 are diagrams illustrating a susceptive period for NB stages and a backoff countdown during a frame transmission, according to an embodiment.
Figure 3:
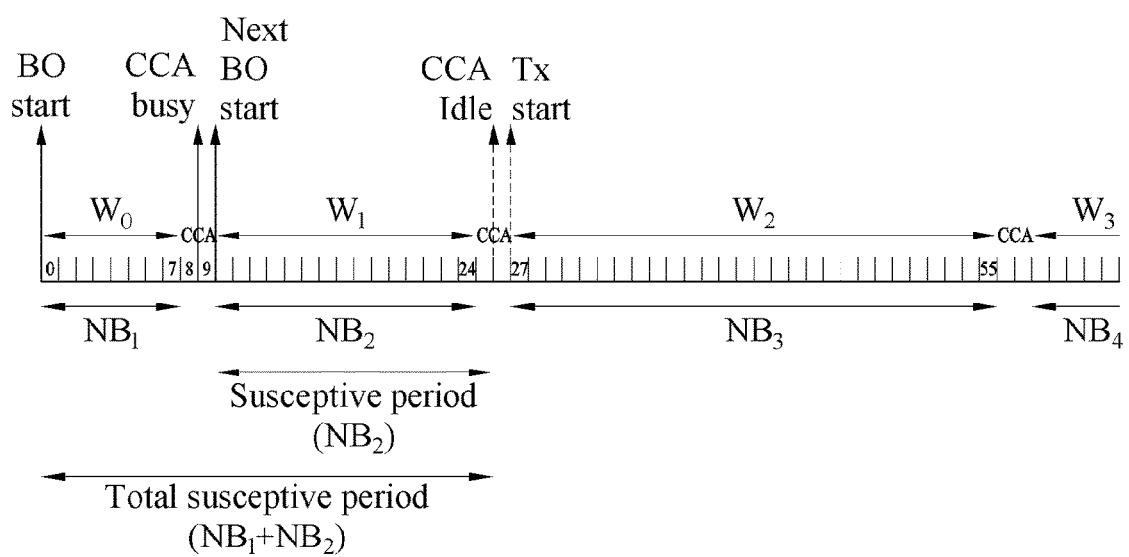

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Also, in the description of embodiments, detailed description of well-known related structures or functions will be omitted when it is deemed that such description will cause ambiguous interpretation of the present disclosure.

The terms "user equipment (UE)" and "ultra-low power (ULP) device" are used interchangeably in this disclosure.

Prior to describing the embodiments in detail, definitions of terms are provided as below.

A beacon order (BO) is an interval between two beacon frames. The beacon order is associated with a duration of a super frame. The duration of the super frame corresponds to $2^{BO} \times a$ BaseSuperFrameDuration. In the foregoing expression, BaseSuperFrameDuration is a duration of a basic super frame.

A bit error rate (BER) is a number of bit errors per unit time.

A carrier sense multiple access with collision avoidance (CSMA/CA) is a channel access method of ULP devices using a random binary exponential backoff countdown to minimize a collision.

A clear channel assessment (CCA) is a physical channel sense requested from a media access control (MAC) layer after a backoff countdown is completed. A channel is to be idle during a period of time defined to initiate transmission by a ULP device.

A contention window (CW) is a number of times that the CCA is performed. A time for which the CCA is performed is defined in units of backoff slots.

A MAC layer corresponds to a second layer of an open systems interconnection (OSI) model that controls an underlying physical layer for transmission and reception of a frame, and defines a protocol and a network coordination for a channel access.

A packet error rate (PER) is a failure rate of a frame measured over a predefined duration.

A request-to-send/clear-to-send (RTS/CTS) is short control frames defined by the Institute of Electrical and Electronics Engineers (IEEE) 802.11 standard. The RTS/CTS is used to reserve a channel for transmission in order to avoid a collision during the transmission.

A signal-to-noise ratio (SNR) is measured by a physical layer receiving a frame and passes as a parameter to the MAC layer. The SNR is adjusted based on an offset value and used as a reference or a reference value in a proposed rate selection technique.

A super frame order (SO) is a value that determines an active period in the super frame while a network allows transmission and reception. The SO may be less than the BO. The duration of the active period corresponds to $2^{SO} \times a$ BaseSuperFrameDuration.

A ternary ON-OFF keying (TOOK): is a modulation technique supported by the IEEE 802.15.4q standard.

An error threshold ratio indicates a transition from a collision state to a channel error state.

The embodiments are provided to achieve a method of regulating an SNR in a rate adaptation. In the method, a UE transmits a frame. The method may include an operation of determining a status of a transmitted frame and an operation of computing a probability of a channel being in an idle mode. As further described below, the probability of the channel being in the idle mode is also referred to as, for example, a probability of a channel being idle, a channel idle probability, and an error threshold ratio. The method may include an operation of computing an SNR offset, for example, an effective SNR offset, using the UE based on the computed probability and the status of the transmitted frame. The method may include an operation of regulating an SNR based on the SNR offset.

The method may include an operation of detecting the status of the transmitted frame as successful. The method may include an operation of adjusting a step-down value by incorporating the computed probability. For example, the method adjusts the step-down value by multiplying the probability by the step-down value. The method may include an operation of computing an SNR offset based on the adjusted step-down value and a candidate offset.

The method may include an operation of detecting the status of the transmitted frame as failed. The method may include an operation of determining a cause of failure based on the probability of the channel being in the idle mode. The cause of failure may be a collision error or a channel error. The method may include an operation of computing the SNR offset based on the determined cause.

The method may include an operation of detecting the cause of failure of the transmitted frame as the channel error. The method may include an operation of computing the SNR offset based on a difference between a candidate SNR offset and a step-up value.

In an example, a probability defines a cause rule for each transmitted frame based on a backoff stage that the UE enters during a channel access for transmission of a frame.

Rate Adaptation (RA) Mechanism in Related Art

A rate selection technique is classified into an open loop mechanism and a closed loop mechanism. In the open loop mechanism, only a transmitting device, for example, a transmitter, is involved in selecting a best rate for transmission. A simple rate selection technique includes an operation of collecting a status of transmissions and receptions statistics for each supported rate. The operation of collecting statistics is performed to monitor a failure and a success of transmission in a corresponding rate. When the number of failed frames or successful frames exceeds a preset number, a transmission rate is downshifted or upshifted correspondingly. Also, the receptions statistics are used to derive a probability of a success for each transmission rate and are used as a complementary input to assess a channel condition.

In the closed loop rate selection mechanism, a receiving device, for example, a receiver, is involved in a process of selecting a transmission rate. The receiving device provides inputs such as the number of frame check sequence (FCS) errors, detection failure errors, and an SNR value of a received frame. An advantage of closed loop RA is noticeable when the traffic is symmetric in both a transmitting direction and a receiving direction.

In general, traffic in a wireless personal area network (WPAN), such as an IEEE 802.15.4 WPAN, is uplink traffic, for example, from the ULP device to a network controller entity or a coordinator. When the channel access mechanism is the CSMA/CA, the open loop RA is a default selection. However, there has an inherent problem that a reason for the failure of transmission is not determined. A failure of transmission may occur due to a collision with another transmission or a bad channel condition that attenuates a signal strength to a level less than or equal to a detectable level. That is, the failure of transmission may occur due to a collision with another transmission or a bad channel condition.

In related art, various mechanisms are provided to identify a cause of transmission failure. For example, in wireless local area network (WLAN) standards such as IEEE 802.11, an RTS/CTS mechanism is used to reserve a channel for transmission. The RTS/CTS mechanism isolates errors. Also, the ULP device continuously monitors an idle channel with respect to a predetermined number of time units, for example, time slots. The ULP device tracks the number of time slots when the channel is busy. The ULP device determines the probability of the channel being idle to obtain a probability of a channel collision. The probability of the collision and a measured probability of a frame loss are used to determine a probability of a channel error. A rate for subsequent transmission is selected by comparing a current SNR to a required SNR threshold.

The open loop rate selection procedure eliminates a control overhead. For this reason, the open loop rate selection procedure may be widely used. The open loop rate selection procedure is based on an SNR threshold technique and includes two stages, an inner loop and an outer loop. The outer loop is on a receive path. The outer loop maintains the offset value Δ that is subtracted from an SNR of a received frame, for example, an ACK frame. The outer loop adjusts the offset value Δ based on the status of the transmitted frame. When a frame is transmitted successfully, for example, when an expected ACK is received, the offset value Δ is reduced by a step-down value $\Delta_d$. When the frame is lost, the offset value Δ is increased by a step-up value $\Delta_u$. The offset value Δ is adjusted using Equation 1.

$$\Delta = \begin{cases} \Delta - \Delta_d & \text{For successful transmission} \\ \Delta + \Delta_u & \text{For failed trasnmission} \end{cases} \quad [\text{Equation 1}]$$

In Equation 1, $\Delta_u$ is selected based on a required rate for convergence of the data rate after failure. $\Delta_d$ is determined using Equation 2.

$$\Delta_d = \frac{\Delta_u}{(1/PER) - 1}$$

The SNR is adjusted based on the offset value using Equation 3.

$$SNR = SNR - \Delta \quad [\text{Equation 3}]$$

The inner loop is on a transmission path and used for rate selection during transmission. The inner loop uses an adjusted SNR that is compared to a threshold SNR requirement for each supported rate. The adjusted SNR is an SNR adjusted based on an offset in the outer loop. The inner loop of a rate adaptation technique maintains $SNR_r$ corresponding to an SNR threshold for each supported rate r. When the adjusted SNR satisfies Equation 4, a transmission rate having an index r is selected.

$$SNR_{r-1} < SNR \leq SNR_r \quad [\text{Equation 4}]$$

Issues in RA for IEEE 802.15.4 Device

An IEEE 802.15.4 device is highly power-constrained and traffic is mainly from the ULP device to the coordinator. ULP devices operate using batteries and are required to function at least five years without replacement in applications such as an e-health unit for personal or medical usage. Because of a small initial contention window (CW≥8) specified by the standard, transmissions are prone to collision easily during a channel access-based contention. The failures due to collision cause the SNR to decrease in the outer loop, which eventually results in a lower transmission rate selection by the inner loop. Such unnecessary rate downshift results not only in a lower throughput, but also higher energy consumption. A mechanism through which determining the failures due to the collision and preventing the rate downshifts is allowed has not been provided. When the number of ULP devices in the network increases and channel collision becomes more prominent than channel errors for failure, the offset increases significantly. Thus, the ULP device selects a lower rate for the transmission. Due to the aforementioned issue, degradation in throughput for the ULP device may occur. In the case of hidden devices, because of long duration of the transmission, channel collisions may frequently occur, which may lead to further degradation of the throughput for the ULP device and a waste of energy in retransmission.

Unlike systems and methods in the related art, the method disclosed herein determines an offset value for the SNR adjustment in a rate adaptation in the channel access-based CSMA/CA. The proposed method regulates the offset value that is used for the SNR adjustment in the outer loop of the rate selection technique. The disclosed method determines the cause of failure of transmission. The disclosed method may not require an idle listening or a control overhead to select an optimal transmission rate and improve throughput and energy efficiency.

In the methods of the related art, an ideal reason for which a multi-rate-capable ULP device selects a lower transmission rate is transmission failure due to a relatively low SNR provided through the channel. In a dense network with saturated traffic conditions, an RA mechanism-based SNR may unnecessarily downshift the rate due to a channel collision and decrease the throughput significantly. The proposed method allows a cause rule based on rate adaptation (CRBRA) mechanism. The CRBRA mechanism is executed in consideration of the idle condition of the channel without idle listening and statistic measurements. The CRBRA mechanism determines a cause rule condition to interdict the SNR adjustment during the failures. Also, the cause rule computes an effective SNR and the SNR adjustment to select the higher transmission rate.

Unlike the systems and methods in the related art, the disclosed method interdicts the unnecessary SNR adjustments in a saturated traffic condition. The disclosed method eliminates undesired rate downshifts occurring due to inevitable offset adjustments resulting from channel collision errors. The optimal rate is selected to increase transmission opportunities and increase a network capacity by reducing the susceptive period and the retransmission. Through this method, transmission duration may be reduced. The disclosed method improves the energy efficiency and prohibits collided devices from selecting lower rates. Thus, an improved channel access may be provided. The disclosed method provides an appropriate rate selection following the channel condition with a low convergence time.

The disclosed method is implemented in a low power device, for example, a ULP device that does not require an idle listening or is not supported by a MAC protocol. The disclosed method is implemented in a network in which little downlink traffic is present to determine a channel activity. The disclosed method does not require a statistic measurement or complex computations measurement. The disclosed method computes the probability of channel collision estimated after an actual channel collision. The disclosed method computes the probability of an idle channel following an actual idle channel.

The disclosed method provides the rate selection mechanism in ULP wireless communications and a multi-rate-based channel access CSMA/CA. The MAC layer is constrained by limited power to support measurement and feedback of rate selection parameters. The rate selection technique selects an appropriately high rate to avoid retransmission due to an error in a channel. For example, the rate selection technique selects a rate that minimizes a transmission time per frame.

The offset is maintained in order to follow the channel condition based on the status of the transmission. A reason for a failure of transmission may not be readily distinguished from that of the collision. For this reason, the MAC layer may use mechanisms such as an idle listening and a channel reservation to isolate failure causes. These mechanisms are not implementable for a low-power device in which energy efficiency decreases due to the idle listening and the control overhead. The disclosed method isolates transmission failures due to collision and poor channel conditions for the ULP device. The disclosed method is provided based on the susceptive period for the failure due to the collision of the transmissions. The susceptive period is used to determine a probability of a channel busy condition at a given instant of the frame transmission. The susceptive period defines a method to adjust the SNR for successful and failed transmissions to pursue the channel conditions that allows the ULP device to select the most appropriate transmission rate.

The disclosed method is related to an offset adjustment for a successful transmission. The disclosed method accounts for the channel idle condition and the step-down value. The channel idle probability defines a level of clarity or a level of confidence in observing the channel condition.

The proposed method determines the susceptive period. The susceptive period may be a duration for which the transmission is vulnerable to collision errors. The proposed method defines the susceptive period as a function of a backoff stage during a random backoff in the CSMA/CA. Based on the susceptive period, the proposed disclosed method eliminates idle listening and control overheads to isolate the channel collisions from the channel errors.

The disclosed method provides a cause rule that is determined by an error threshold ratio to adjust the offset value when a transmission fails. The proposed method maintains a collision state and a channel error state of the rate adaptation technique for failed frames. The error threshold ratio provides a condition of a channel as the function of the susceptive period that defines the probability of the channel being idle. The error threshold ratio is applied to a state transition from the collision state to the channel error state.

The disclosed method controls transmission duration and retransmissions and improves the throughput of the network by increasing successful transmissions. The disclosed method reduces an adverse downshift and fluctuations of the transmission rate, and results in small transmission duration so as to increase energy efficiency.

Unlike the systems and methods in the related art, the disclosed method does not monitor the channel activity during the backoff countdown. The RTS/CTS may not be allowed in a low power standard.

Hereinafter, example embodiments are described with reference to FIGS. 1 through 9.

The disclosed method regulates an SNR offset value, for example, an effective SNR value, used for an SNR adjustment to provide a transmission rate associated with channel errors. The disclosed method allows ULP devices to select a transmission rate that improves a throughput of a ULP device that experiences a channel collision. Also, when the channel condition is improved, the disclosed method allows the ULP device to recover from a bad channel condition and quickly converge to an optimal transmission rate.

Proposed CRBRA Technique

In order to segregate the transmission failures due to channel error and channel condition, the probability of a channel being idle is monitored. A channel idle probability $p_i$ is determined using Equation 5. The channel idle probability is also referred to as, for example, a probability of a channel being in an idle mode, a probability that a channel is in an idle mode, and a probability of a channel being idle.

$$p_i = \frac{\text{Number of idle slots}}{\text{Number of observed slots}} \rightarrow p_b = p_c = 1 - p_i \quad \text{[Equation 5]}$$

In Equation 5, $p_b$ is a probability of a channel being busy, and $p_c$ is a probability that a transmitted frame fails due to a collision.

A probability $p_s$ of frame success observed from transmission statistics is determined using Equation 6.

$$p_s = \frac{NumberofreceivedACKs}{Numberoftransmitted \text{ Frames}} \rightarrow p_l = 1 - p_s \quad \text{[Equation 6]}$$

In Equation 6, $p_l$ is a probability of a frame loss due to a channel error or a collision error.

A probability $p_e$ of a frame loss due to a channel error is determined using Equation 7.

$$p_e = \frac{p_l - p_c}{1 - p_c} \quad \text{[Equation 7]}$$

To determine the probability $p_i$, the ULP device listens to the channel. Since the channel is to be idle for the random backoff duration while accessing the channel using the CSMA/CA, listening to the channel may not affect an IEEE 802.11 device, whereas the CSMA/CA is slightly different in an IEEE 802.15.4 device. Due to power constraints, the ULP device does not sense a channel during the backoff countdown. FIG. 1 is a timing diagram of a CSMA/CA in the IEEE 802.15.4. In FIG. 1, NB=5, NB being the number of backoff stages. At each of the backoff stages, a random backoff window $W_k$ is obtained using Equation 8.

$$W_k = 2^m - 1 \forall k = 1, \ldots 5 \text{ and} \quad \text{[Equation 8]}$$
$$m = \begin{cases} 43, & 4 \text{ when } k = 1, 2 \\ 5 & \text{otherwise} \end{cases}$$

A unit backoff slot duration corresponds to 20 symbols, for example, 20×16 microseconds (μs). A backoff has five stages and a backoff count is selected based on the random backoff window $W_k$ obtained by Equation 8.

A channel state may not be monitored during a backoff countdown. For example, the channel state may not be monitored for $NB_1$, $NB_2$, $NB_3$, and/or $NB_4$. The probability $p_i$ of the channel being idle and a probability of a collision $[1-p_i(=p_c)]$ may not be determined through an idle listening in a low power device such as an IEEE 802.15.4 device. The CSMA/CA in the IEEE 802.11 device performs the backoff countdown only when the channel is idle. The ULP device is aware of the channel being idle/busy during the backoff countdown. The susceptive period, for example, a period for which a frame transmission is prone to the collision is confined to a duration of a frame and an acknowledgement. In contrast, in the IEEE 802.15.4 standard, it is difficult to determine the probability $p_i$ and the probability $p_b$ using the ULP device according to Equations 5 through 7. The ULP device determining the probability $p_i$ and the probability $p_b$ in the IEEE 802.15.4 standard will be described as follows.

When p is an expected probability of the channel being idle, a probability q that channel is busy is expressed as q=1−p. The expected probability p corresponds to the probability $p_i$, and the probability q corresponds to the probability $p_b$. When the ULP device finds a channel busy during a $(k-1)^{th}$ backoff stage, the ULP device enters a $k^{th}$ backoff stage. Since the CCA status is assumed to be busy in a previous stage, at the $k^{th}$ backoff stage, the probability of the channel being busy corresponds to a ratio of a total susceptive period until the $(k-1)^{th}$ backoff stage to a total susceptive period until the $k^{th}$ backoff stage. See, for example, FIGS. 2 and 3. Thus the probability of the channel being busy during the backoff countdown and is determined using Equation 9.

$$q = \frac{\sum_{i=1}^{k-1} W_i}{\sum_{i=1}^{k} W_i} \quad \text{[Equation 9]}$$

An expected probability that a frame is not to fail due to a collision at the $k^{th}$ backoff stage corresponds to the probability that the channel is idle, and is expressed as, for example, p=1−q. In this example, the expected probability p is determined using Equation 10.

$$p = 1 - \frac{\sum_{i=1}^{k-1} W_i}{\sum_{i=1}^{k} W_i} = \frac{W_k}{\sum_{i=1}^{k} W_i} \quad \text{[Equation 10]}$$

In Equation 10, p is a ratio of a backoff window at a stage k at which the transmission starts, to a sum of all k-stage backoff windows. For example, p is a ratio of a backoff window of the $k^{th}$ stage to a total susceptive period at the stage k during a frame transmission.

The CRBRA mechanism is an open loop method of the rate adaptation. The CRBRA mechanism has two states, a collision state and a channel error state for transitioning to an outer loop stage of the RA technique. The probability of the frame loss in a transmission-failed status is determined using Equation 11.

$$p_l = p_c + p_e > 0 \quad \text{[Equation 11]}$$

In Equation 11, a loss is calculated under an assumption that the probability $p_c$ and the probability $p_e$ are disjoint events. The probability $p_e$ is also represented by binary expressions as shown in Equations 12 and 13.

$$p_l = 1 \rightarrow p_c = 0 \rightarrow p_e = 1 \quad \text{[Equation 12]}$$

$$p_l < 1 \rightarrow p_c > 0 \rightarrow p_e = 0 \quad \text{[Equation 13]}$$

A default state of the CRBRA technique during a failed transmission status is the collision state. According to the binary expressions, the collision state is expressed by Equation 14.

$$(p_l = p_c) > 0 \quad \text{[Equation 14]}$$

When p is obtained as a value of 1 using Equation 10, $p_c$ is 0, which represents that a cause of the frame loss is not a collision while the channel is idle. In this example, a cause of a frame failure may be the channel error and thus, $p_e > 0$. An error threshold ratio $$\frac{W_k}{\sum_{i=1}^{k} W_i}$$

defines a condition for the outer loop to perform an offset adjustment on an SNR.

When the transmitted frame is successful, an adjusted SNR is determined using Equation 15.

$$\Delta = \Delta - \frac{W_k}{\sum_{i=1}^{k} W_i} \times \Delta_d \quad \text{[Equation 15]}$$

Equation 15 corresponds to operation 410 (FIG. 4) as further discussed below. A probability $$\frac{W_k}{\sum_{i=1}^{k} W_i}$$

represents a contribution of an idle channel condition. When the number of the backoff stage NB for the transmitted frame is 1, a probability $$"\frac{W_k}{\sum_{i=1}^{k} W_i} = 1"$$

represents that a channel is idle and a successful transmission status is acquired in a good channel condition. A probability $$"\frac{W_k}{\sum_{i=1}^{k} W_i} < 1"$$

represents a probability that a channel is busy. Since the default state of the CRBRA mechanism is in the collision state, a multiplication factor, for example, $$\frac{W_k}{\sum_{i=1}^{k} W_i}$$

is used as the probability of the collision in a successful transmission. In the successful transmission, $p_l$, $p_c$, and $p_e$ are expressed by Equations 16 and 17.

$$p_l < 1 \rightarrow p_c > 0 \rightarrow p_e > 0 \quad \text{[Equation 16]}$$

$$p_l = 1 \rightarrow p_c = 0 \rightarrow p_e = 0 \quad \text{[Equation 17]}$$

For example, in the successful transmission, when $p_l$ is less than 1, or when the channel idle probability or the error threshold ratio is less than 1, $p_c$ and $p_e$ are greater than 0. Also, when $p_i$ is equal to 1, $p_c$ and $p_e$ are equal to 0.

When the transmission fails and the error threshold ratio $$\frac{W_k}{\sum_{i=1}^{k} W_i} = 1$$

is the offset is adjusted. The offset is, for example, $\Delta=\Delta+\Delta_u$. Related descriptions will be provided with reference to operation 414 of FIG. 4.

When the error threshold ratio is $$\frac{W_k}{\sum_{i=1}^{k} W_i} < 1,$$

the offset is not adjusted. In other words, an offset $\Delta$ remains without change. In this example, an undesired downshift may occur, and related descriptions will be provided with reference to operation 412 of FIG. 4.

When the transmission fails, $p_i$, $p_c$, and $p_e$ are expressed by Equations 18 and 19.

$p_i<1 \rightarrow p_c>0 \rightarrow p_e=0$ [Equation 18]

$p_i=1 \rightarrow p_c=0 \rightarrow p_e=1$ [Equation 19]

In the failed transmission, when $p_i$ is less than 1, or when the channel idle probability or the error threshold ratio is less than 1, $p_c$ is greater than 0 and $p_e$ is equal to 0. In the failed transmission, when $p_i$ is equal to 1, $p_c$ is equal to 0 and $p_e$ is equal to 1. Accordingly, it is determined whether the cause of the failure of the frame transmission is the collision error or the channel error.

In both cases, for example, when the frame transmission succeeds and fails, an effective SNR is determined using Equation 20.

$SNR_{eff}=SNR-\Delta$ [Equation 20]

$SNR_{eff}$ is used by the inner loop to select an RA rate.

When $SNR_{eff}$ satisfies Equation 21, a transmission rate having an index r is selected.

$SNR_{r-1}<SNR_{eff}\leq SNR_r$ [Equation 21]

Figure 4:
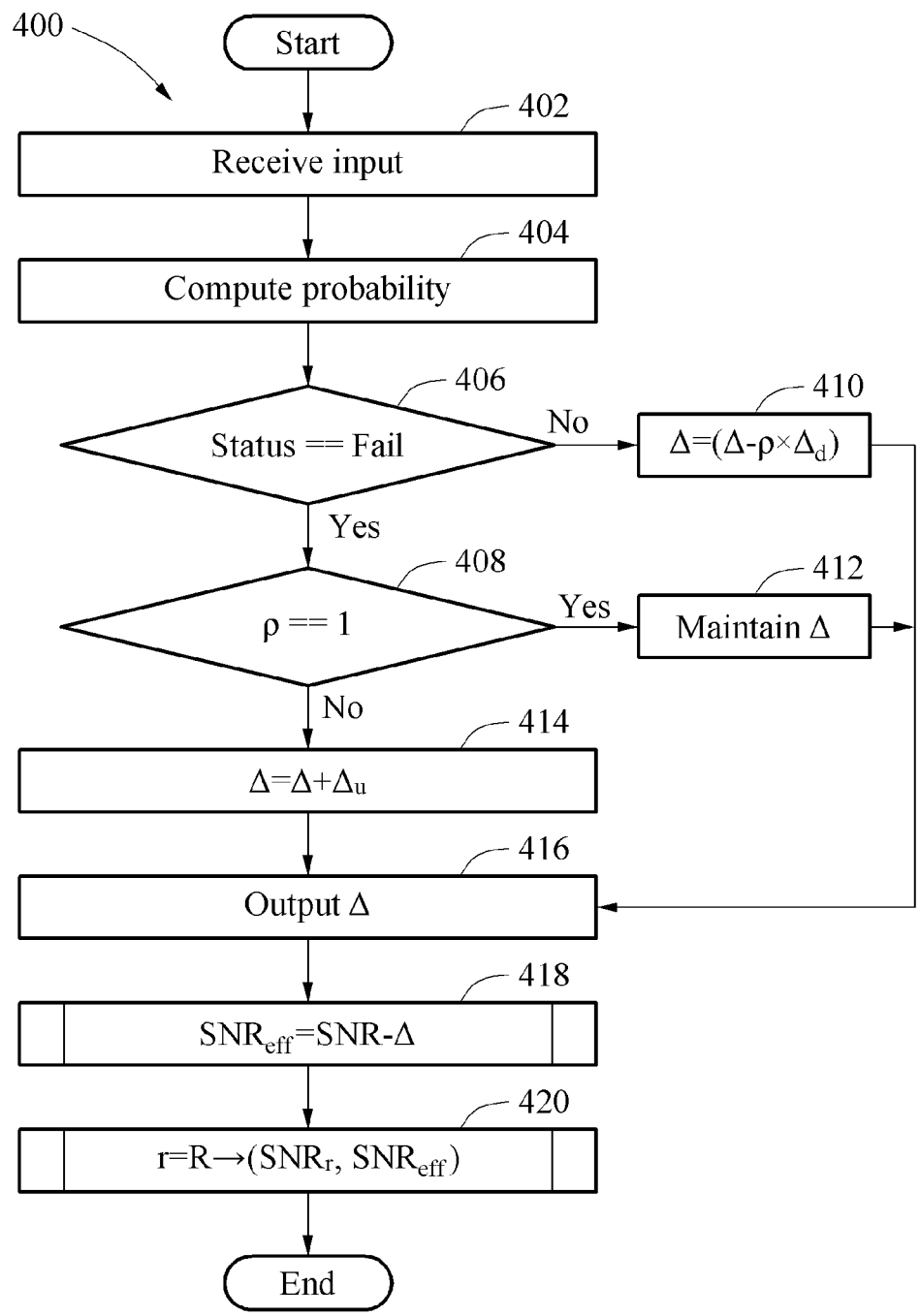
FIG. 4 is a flowchart illustrating a method of regulating a signal-to-noise ratio (SNR) in a rate adaptation, according to an embodiment.

FIG. 4 is a flowchart illustrating a method 400 of regulating an SNR in a rate adaptation, according to an embodiment.

Referring to FIG. 4, in operation 402, a communicator (not shown) of a UE receives the input. In operation 404, an expected probability of a channel being in an idle mode is computed. Depending on examples, the expected probability is expressed as a probability of the channel being idle, a probability of the channel being in the idle mode, or an error threshold ratio. For example, a controller computes an expected probability $$\frac{W_k}{\sum_{i=1}^{k} W_i}.$$

In operation 406, the controller to determine the status of the transmitted frame. When the transmitted frame is in a failure status, the controller determines whether a ratio of backoff window is 1 in operation 408. The ratio of backoff window may be the computed expected probability $$\frac{W_k}{\sum_{i=1}^{k} W_i}.$$

For example, the controller determines the computed expected probability is 1.

When the transmitted frame is in a success status, the controller computes an SNR offset $\Delta$ in operation 410. For example, $\Delta=\Delta-(\rho\times\Delta_d)$. Here, $\Delta_d$ is a step-down value and $\rho$ is an expected probability.

When the ratio of the backoff window is determined to be 1 in operation 410, the controller computes the SNR offset $\Delta$ in operation 412. In operation 412, the controller maintains the SNR offset $\Delta$. In other words, the SNR offset $\Delta$ is not changed.

When the ratio of the backoff window is not determined to be 1 in operation 410, the controller computes the SNR offset in operation 414. For example, $\Delta=\Delta+\Delta_u$. Here, $\Delta_u$ is a step-up value.

In operation 416, the controller outputs the SNR offset $\Delta$. The output SNR offset may be an adjusted value or an unadjusted value. For example, the SNR offset adjusted in operation 410, the SNR offset adjusted in operation 414, or an unchanged SNR offset may be output.

In operation 418, the controller computes the effective SNR. The effective SNR is computed using an equation "$SNR_{eff}=SNR-\Delta$" in operation 418. In operation 418, an SNR is adjusted to be an offset value. In operation 420, the effective SNR is used to determine a transmission rate having an index r. If $r=R \rightarrow (SNR_r, SNR_{eff})$, the transmission rate having the index r is selected. For example, according to Equation 21, when an effective SNR, $SNR_{eff}$ is less than or equal to $SNR_r$ and greater than $SNR_{r-1}$, the transmission rate having the index r is selected.

In a commonly used open loop based on the rate selection mechanism, the SNR is adjusted using the offset based on success and failure statuses of the transmission. When the frame transmission fails and the error threshold ratio is not 1, a new offset is determined by adding the step-up value to the offset. When the transmission is successful, the new offset is determined by subtracting the step-down value from the offset. The new offset is compared to an SNR threshold. The disclosed method regulates an SNR adaptation efficiently. In the disclosed method, a selection of a best transmission rate is not required for idle listening or control overhead to improve throughput and energy efficiency.

Figure 5:
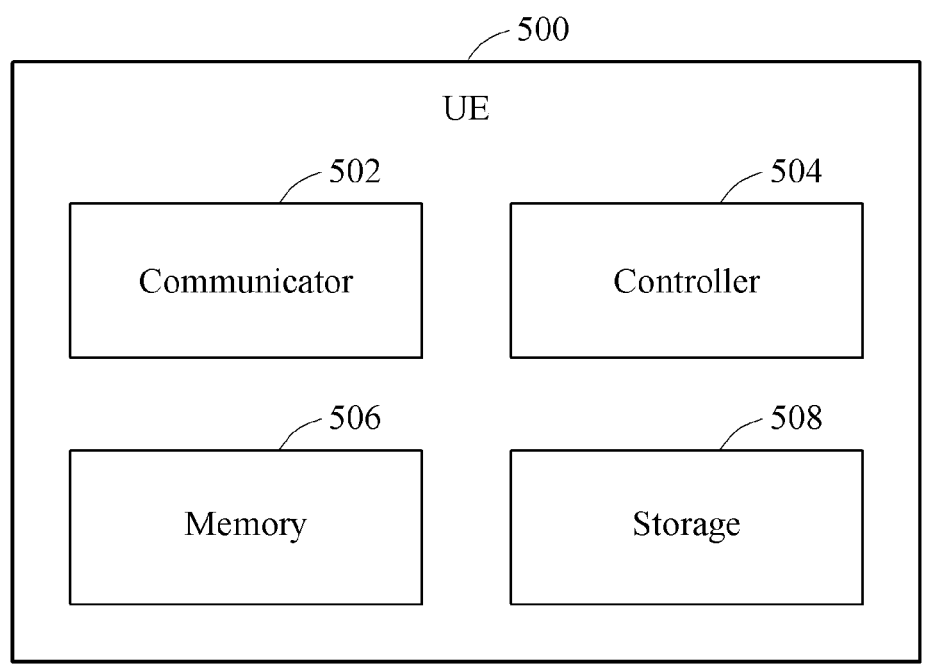
FIG. 5 is a diagram illustrating various components of user equipment (UE), according to an embodiment.

FIG. 5 is a diagram illustrating components of a UE 500, according to an embodiment. The UE 500 is, for example, a laptop computer, a personal digital assistant (PDA), a cellular phone, a smartphone, or a tablet personal computer (PC). However, the UE 500 is not limited to the aforementioned examples. The UE 500 includes a communicator 502, a controller 504, a memory 506, and a storage 508. The communicator 502 transmits a frame. The communicator 502 internally communicates with internal units, and communicates with external devices through at least one network. The controller 504 determines a status of a transmitted frame and computes a probability of a channel being in an idle mode. The controller 504 computes an SNR offset based on the status of the transmitted frame and the computed probability.

The controller 504 may detect the status of the transmitted frame as successful. The controller 504 adjusts a step-down value by incorporating the probability of the channel being in the idle mode. For example, the controller 504 multiplies the probability of the channel being in the idle mode by the step-down value. Through this operation, the step-down value is adjusted. The controller 504 computes the SNR offset based on a difference between a candidate offset and the adjusted step-down value. For example, the controller 504 computes an SNR offset $\Delta$ according to an equation "$\Delta=\Delta_{candidate}-(\rho \times \Delta_d)$". A candidate offset $\Delta_{candidate}$ is also referred to as, for example, an initial offset or a current offset.

The controller 504 may detect the status of the transmitted frame as failed. The controller 504 determines a cause of failure based on the probability of the channel being in the idle mode. The cause of failure is a collision error or a channel error. For example, when the status of the transmitted frame is detected as failed and the probability of the channel being in the idle mode is 1, the controller 504 determines that the cause of failure is a collision error. When the status of the transmitted frame is detected as failed and the probability of the channel being in the idle mode is not 1, the controller 504 determines that the cause of failure is a channel error.

The controller 504 computes the SNR offset based on the determined cause of failure. The controller 504 may detect the cause of failure of the transmitted frame as a collision error. The controller 504 then computes the SNR offset based on a candidate SNR offset. For example, the controller 504 may determine that the SNR offset is equal to the candidate SNR offset. Also, the controller 504 may detect the cause of failure of the transmitted frame as a channel error. The controller 504 then computes a new SNR offset based on a difference between the step-up value and a current SNR offset.

The controller 504 determines an error threshold ratio used to define a cause rule for each transmitted frame based on a backoff stage that the UE 500 enters during a channel access for transmission of a frame.

The controller 504 determines a component of a channel idle probability based on the backoff stage that the UE 500 enters during the channel access for transmission of a frame.

When a frame transmission succeeds, the controller 504 adjusts the step-down value by incorporating the channel idle probability. For example, the controller 504 multiplies the channel idle probability by the step-down value. Through this operation, the step-down value is adjusted. The controller 504 computes the SNR offset based on the adjusted step-down value.

When the frame transmission fails, the controller 504 determines a state of the rate adaptation scheme as a collision state or a channel error state based on the cause rule defined using the error threshold ratio. For example, the controller 504 determines the state of the rate adaptation scheme as the collision state when the error threshold ratio is 1 and determines the state of the rate adaptation scheme as the channel error state when the error threshold ratio is not 1.

The controller 504 computes the SNR offset based on the error threshold ratio.

When the rate adaptation scheme is in the channel error state, the controller 504 adds the step-up value to an offset value or subtracts the step-up value from the offset value. Through this operation, the offset value is adjusted.

When the rate adaptation scheme is in the collision state, the controller 504 subtracts 0 from the offset value. Thus, the offset value is remains as the same.

The controller 504 computes an effective SNR based on a reference value so as to provide a rate selection for a subsequent frame to be transmitted. The reference value indicates a current SNR.

The controller 504 maintains the SNR from a successfully received frame.

To determine a transmission rate for the subsequent frame, the controller 504 compares the effective SNR and an SNR threshold.

A probability is used to define a cause rule for each transmitted frame based on a backoff stage that the UE 500 enters during a channel access for transmission of a frame. Here, the probability indicates an expected probability.

Also, the controller 504 re-computes the effective SNR based on the SNR offset.

Figure 6:
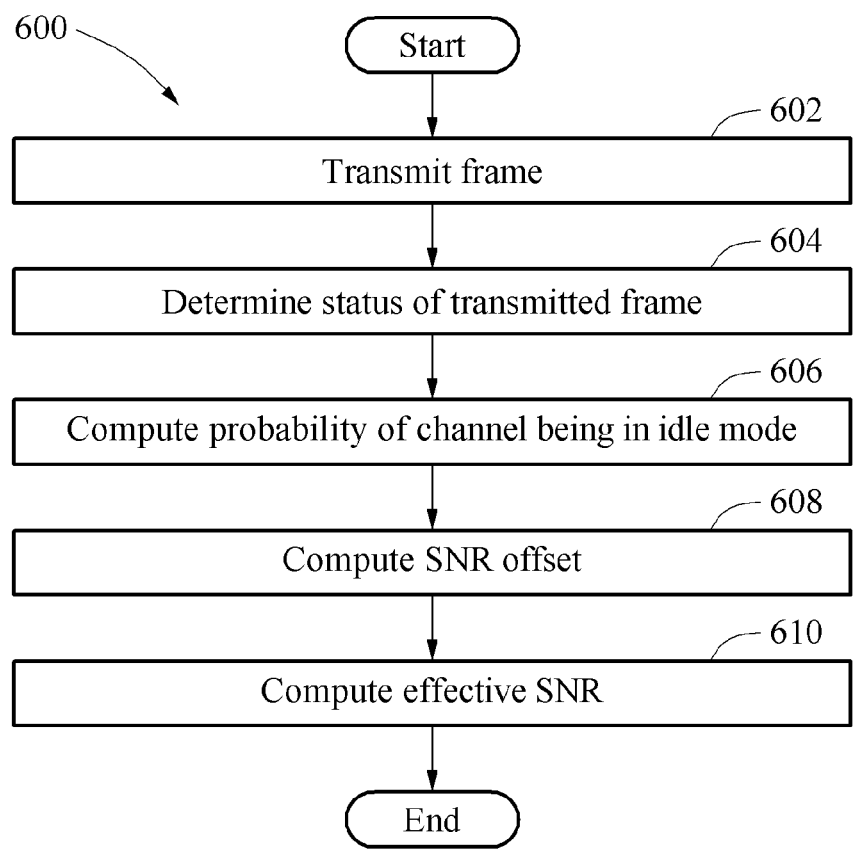
FIG. 6 is a flowchart illustrating a method of regulating an SNR in a rate adaptation based on a probability of a channel being in an idle mode and a status of a transmitted frame, according to an embodiment.

FIG. 6 is a flowchart illustrating a method 600 of regulating an SNR in a rate adaptation based on a probability of a channel being in an idle mode and a status of a transmitted frame, according to an embodiment.

Referring to FIG. 6, in operation 602, the communicator 502 transmits a frame. In operation 604, the controller 504 determines a status of the transmitted frame. In operation 606, the controller 504 computes a probability of a channel being in an idle mode. In operation 608, the controller 504 computes an SNR offset.

The controller 504 may compute the SNR offset based on the probability of the channel being in the idle mode and the status of the transmitted frame.

The controller 504 may compute the SNR offset based on a difference between an adjusted step-down value and a candidate offset.

The controller 504 may compute the SNR offset based on a candidate SNR offset.

The controller 504 computes the SNR offset based on a cause. In this example, the cause may be a collision error or a channel error.

The controller 504 may compute the SNR offset based on a difference between the candidate SNR offset and a step-up value.

In operation 610, the controller 504 regulates an SNR by, for example, computing an effective SNR based on the SNR offset.

Figure 7:
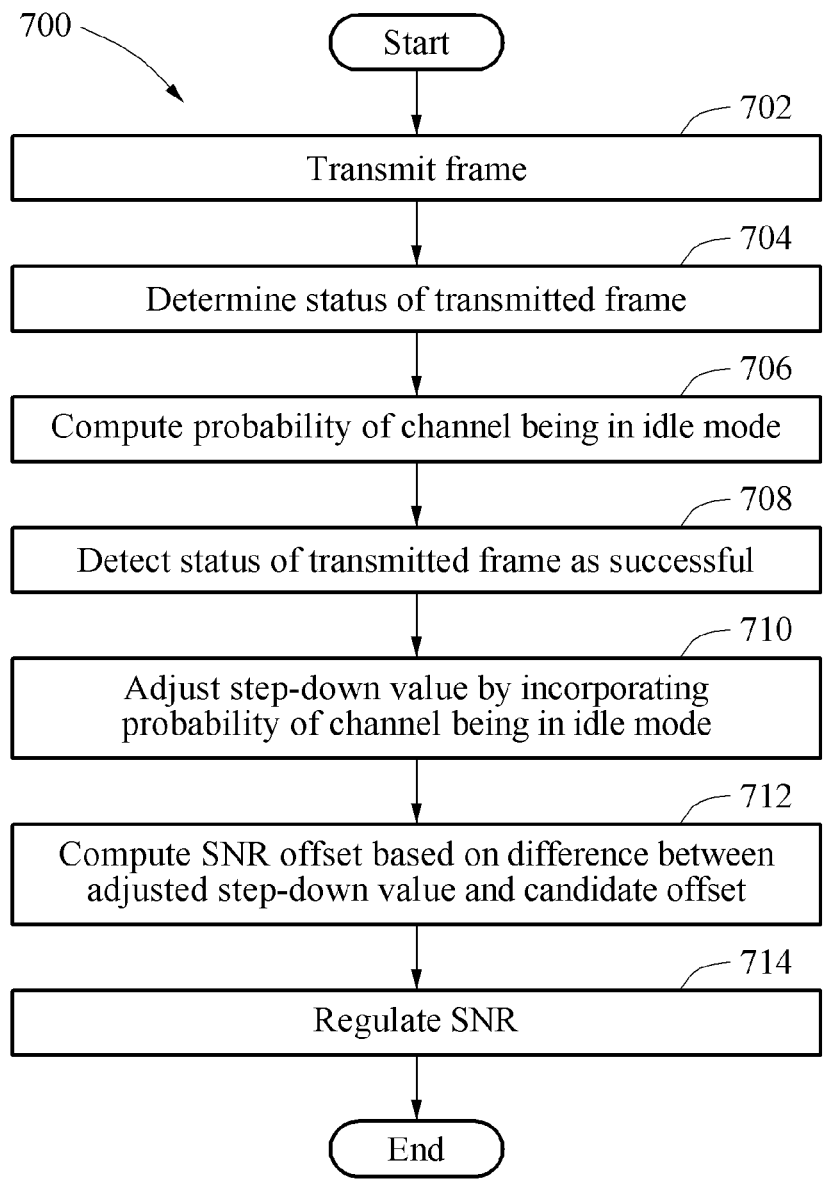
FIG. 7 is a flowchart illustrating a method of regulating an SNR in a rate adaptation when a transmission of a frame succeeds, according to an embodiment.

FIG. 7 is a flowchart illustrating a method 700 of regulating an SNR in a rate adaptation when a transmission of a frame succeeds, according to an embodiment.

Referring to FIG. 7, in operation 702, the communicator 502 transmits a frame.

In operation 704, the controller 504 determines a status of the transmitted frame.

In operation 706, the controller 504 computes a probability of a channel being in an idle mode.

In operation 708, the controller 504 detects the status of the transmitted frame as successful.

In operation 710, the controller 504 adjusts a step-down value by incorporating the probability of the channel being in the idle mode.

In operation 712, the controller 504 computes an SNR offset based on a difference between the adjusted step-down value and a candidate offset.

In operation 714, the controller 504 regulates an SNR, for example, by computing an effective SNR.

Figure 8:
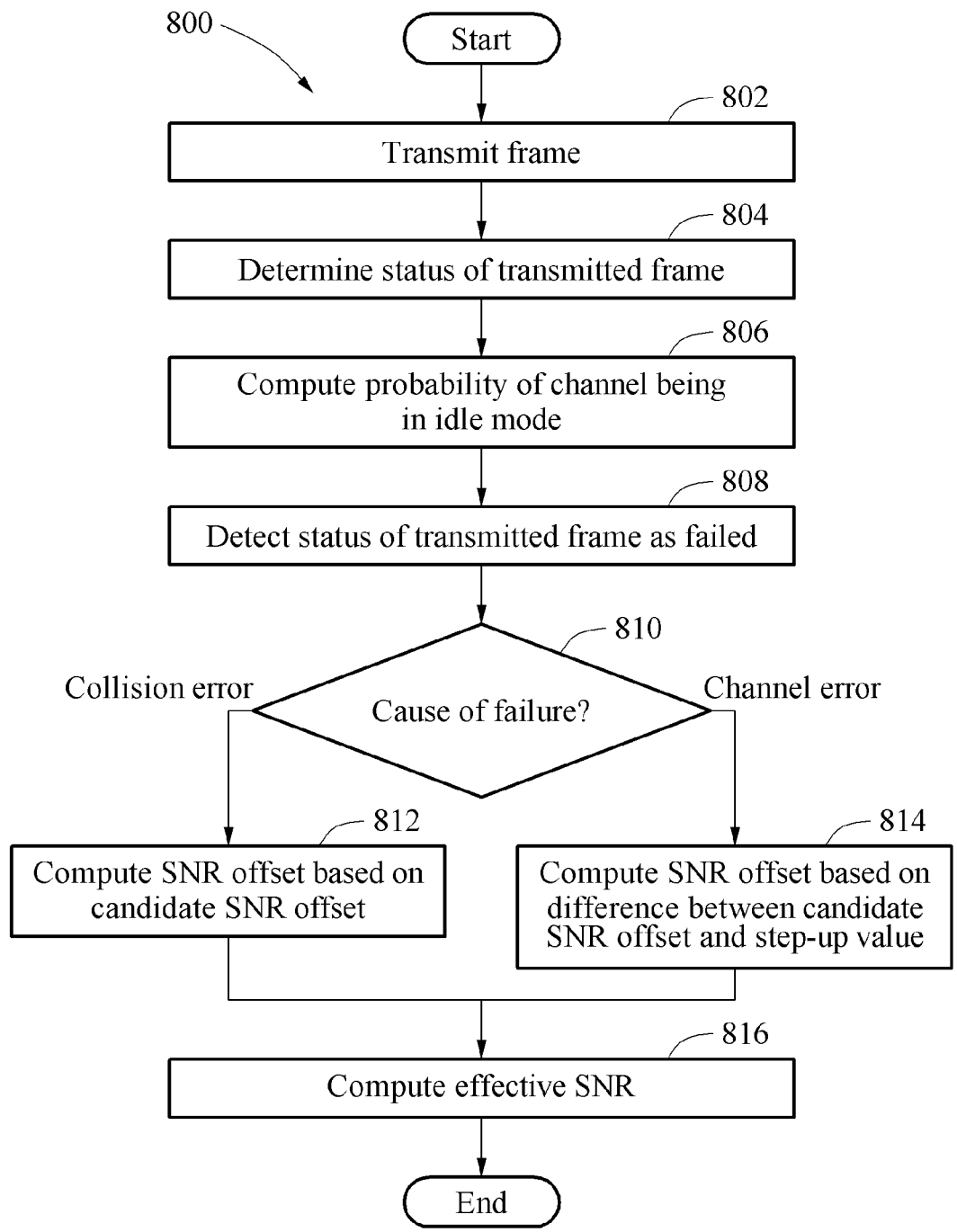
FIG. 8 is a flowchart illustrating a method of regulating an SNR in a rate adaptation when a transmission of a frame fails, according to an embodiment.

FIG. 8 is a flowchart illustrating a method 800 of regulating an SNR in a rate adaptation when a transmission of a frame fails, according to an embodiment.

Referring to FIG. 8, in operation 802, the communicator 502 transmits a frame.

In operation 804, the controller 504 determines a status of the transmitted frame.

In operation 806, the controller 504 computes a probability of a channel being in an idle mode.

In operation 808, the controller 504 detects the status of the transmitted frame as failed.

In operation 810, the controller 504 determines a cause of the failure of the transmitted frame based on the probability of the channel being in the idle mode.

In operation 812, when the cause of the failure is a collision error, the controller 504 computes an SNR offset based on a candidate SNR offset.

In operation 814, when the cause of the failure is a channel error, the controller 504 computes the SNR offset based on a difference between the candidate SNR offset and a step-up value.

In operation 816, the controller 504 computes an effective SNR based on the SNR offset.

Figure 9:
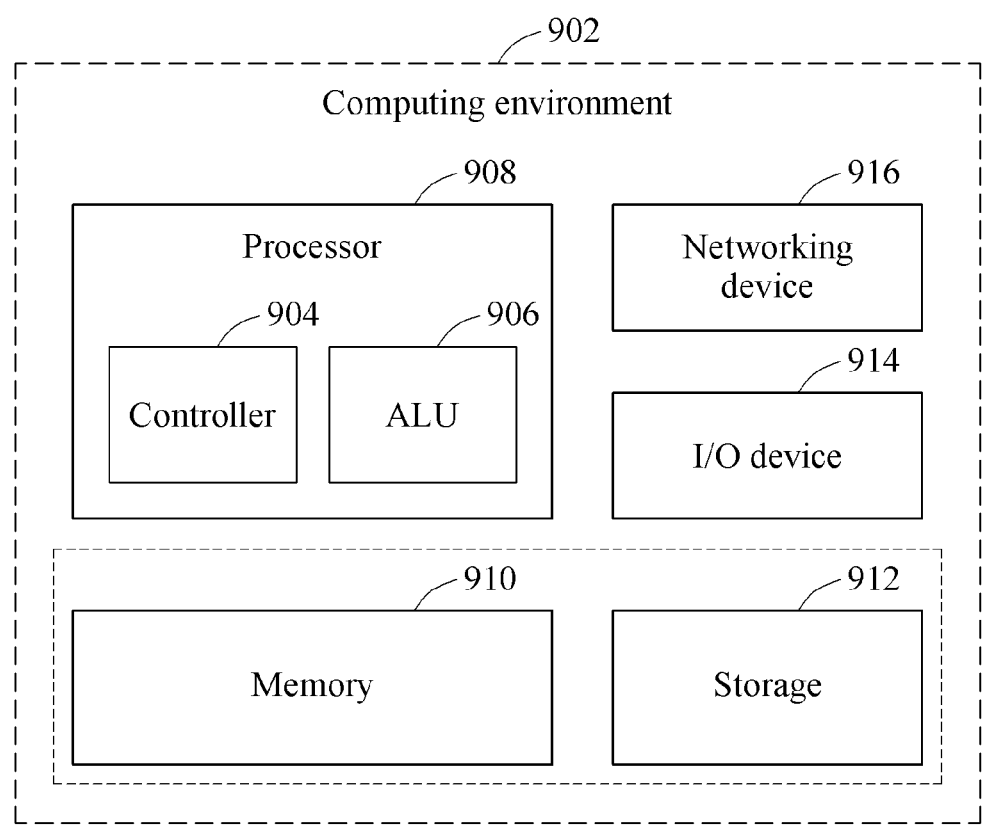
FIG. 9 is a diagram illustrating a computing environment implementing a mechanism for regulating an SNR in a rate adaptation, according to an embodiment.

FIG. 9 is a diagram illustrating a computing environment 902 implementing a mechanism for regulating an SNR in a rate adaptation, according to an embodiment.

The computing environment 902 includes at least one processor 908 including a controller 904 and an arithmetic logic unit (ALU) 906, a memory 910, a storage 912, networking devices 916, and input and output (I/O) devices 914. The processor 908 processes instructions. The processor 908 receives a command from the controller 904 to perform processing of the instructions. Also, any logical and arithmetic operations involved in an execution of the instructions are computed with an assistance of the ALU 906.

The computing environment 902 is configured with various homogeneous or heterogeneous cores, different types of central processing units (CPUs), special media, and other accelerators. Also, the processor 908 may include multiple processors. The processors may be located on a single chip or located on numerous chips.

Codes or instructions for implementation are stored in either the memory 910 or the storage 912 or both. The instructions are fetched from the memory 910 or the storage 912 and executed by the processor 908.

The communicator 502, the controller 504, the memory 506, and the storage 508 in FIG. 5, and the controller 904, the ALU 906, the processor 908, the memory 910, the storage 912, the I/O device 914, and the networking device 916 in FIG. 9 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 4 and 6-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method to regulate a signal-to-noise ratio (SNR) in a transmission rate adaptation, comprising:
    transmitting a frame;
    determining a status of the transmitted frame;
    computing a probability of a channel of the transmitted frame being in an idle mode;
    computing an SNR offset based on the status of the transmitted frame and the probability; and
    regulating the SNR based on the SNR offset,
    wherein the probability is associated with an expected probability that the transmitted frame is not to fail.

2. The method of claim 1, wherein the computing of the SNR offset comprises:
    detecting the status of the transmitted frame as successful;
    adjusting a step-down value by incorporating the probability; and
    computing the SNR offset based on a difference between the adjusted step-down value and a candidate offset.

3. The method of claim 1, wherein the computing of the SNR offset comprises:
    detecting the status of the transmitted frame as failed;
    determining a cause of a failure of the transmitted frame based on the probability, wherein the cause is one of a collision error and a channel error; and
    computing the SNR offset based on the determined cause.

4. The method of claim 3, wherein the computing of the SNR offset based on the determined cause comprises:
    detecting the cause of the failure of the transmitted frame as the collision error; and
    computing the SNR offset based on a candidate SNR offset.

5. The method of claim 3, wherein the computing of the SNR offset based on the determined cause comprises:
    detecting the failure of the transmitted frame as the channel error; and
    computing the SNR offset based on a difference between a step-up value and a candidate SNR offset.

6. The method of claim 1, wherein the probability defines a cause rule for each transmitted frame based on a backoff stage that a user equipment has entered during a channel access for transmission of the frame.

7. A non-transitory computer-readable storage medium storing instructions that, when executed by a processor, cause the processor to perform the method of claim 1.

8. The method of claim 1, wherein the determined status indicates whether the transmission of the frame failed or whether transmission of the frame was successful.

9. The method of claim 1, wherein the probability is a measured expected probability that indicates a failure of a frame due to a collision at a backoff stage that a user equipment has entered.

10. A user equipment to regulate a signal-to-noise ratio (SNR) in a transmission rate adaptation, comprising:
    a controller configured to
        transmit a frame,
        determine a status of the transmitted frame,
        compute a probability that a channel is in an idle mode,
        compute an SNR offset based on the status of the transmitted frame and the probability, and
        regulate the SNR, based on the SNR offset,
        wherein the probability is associated with an expected probability that the transmitted frame is not to fail.

11. The user equipment of claim 10, wherein the controller is further configured to
    detect the status of the transmitted frame as successful,
    adjust a step-down value by incorporating the probability, and
    compute the SNR offset based on a difference between the adjusted step-down value and a candidate offset.

12. The user equipment of claim 10, wherein the controller is further configured to
    detect the status of the transmitted frame as failed,
    determine a cause of a failure of the transmitted frame based on the probability, wherein the cause is one of a collision error and a channel error, and
    compute the SNR offset based on the determined cause.

13. The user equipment of claim 12, wherein the controller is further configured to detect the cause of the failure of the transmitted frame as the collision error and compute the SNR offset based on a candidate SNR offset.

14. The user equipment of claim 12, wherein the controller is further configured to detect the failure of the transmitted frame as the channel error and compute the SNR offset based on a difference between a step-up value and a candidate SNR offset.

15. The user equipment of claim 10, wherein the probability defines a cause rule for each transmitted frame based on a backoff stage that the user equipment has entered during a channel access for transmission of the frame.

16. A method to regulate a signal-to-noise ratio (SNR) in a transmission rate adaptation, comprising:
   transmitting a frame;
   detecting a failure of the transmitted frame;
   determining a cause of the failure of the transmitted frame to be one of a collision error and a channel error, based on a probability of a channel of the transmitted frame being in an idle mode; and
   regulating the SNR, based on the determining of the cause of the failure of the transmitted frame,
   wherein the probability is associated with an expected probability that the transmitted frame is not to fail.

17. The method of claim 16, wherein the regulating of the SNR for transmission comprises maintaining an SNR offset, in response to determining the cause of the failure of the transmitted frame to be the collision error.

18. The method of claim 16, wherein the regulating of the SNR for transmission comprises adjusting an SNR offset, in response to determining the cause of the failure of the transmitted frame to be the channel error.

* * * * *